US011100131B2

(12) United States Patent
Refael et al.

(10) Patent No.: US 11,100,131 B2
(45) Date of Patent: Aug. 24, 2021

(54) SIMULATION OF A SYNCHRONIZATION OF RECORDS (71) Applicant: HEWLETT PACKARD ENTERPRISE DEVELOPMENT LP, Houston, TX (US)

(72) Inventors: Roee Refael, Yehud (IL); Elad Avraham, Yehud (IL); Gil Baruch, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 609 days.

(21) Appl. No.: 15/536,704

(22) PCT Filed: Dec. 23, 2014

(86) PCT No.: PCT/US2014/072029
§ 371 (c)(1),
(2) Date: Jun. 16, 2017

(87) PCT Pub. No.: WO2016/105354
PCT Pub. Date: Jun. 30, 2016

(65) Prior Publication Data
US 2017/0351744 A1 Dec. 7, 2017

(51) Int. Cl.
*G06F 16/00* (2019.01)
*G06F 16/27* (2019.01)
(Continued)

(52) U.S. Cl.
CPC .......... *G06F 16/273* (2019.01); *G06F 9/455* (2013.01); *G06F 11/3065* (2013.01); *G06F 11/3664* (2013.01)

(58) Field of Classification Search
CPC .............. G06F 16/273; G06F 11/3065; G06F 11/3664; G06F 9/455
See application file for complete search history.

(56) References Cited

U.S. PATENT DOCUMENTS 6,449,570 B1   8/2002  Wu
6,633,924 B1  10/2003  Wu et al.
(Continued)

FOREIGN PATENT DOCUMENTS

JP   2008310449 A   12/2008
WO  2011042282      4/2011

OTHER PUBLICATIONS

Elbaum, S. et al., "Techniques for Improving Regression Testing in Continuous Integration Development Environments," (Research Paper), Nov. 16-21, 2014.
(Continued)

*Primary Examiner* — Paul Kim (57) ABSTRACT

A simulation of a synchronization of records between applications may include identifying a plurality of records modified since a previous synchronization of applications. Each record of the plurality of records are analyzed and a modification operation is associated with that record. The modification operation corresponding to a type of modification that can synchronize that record. A simulation of results of an execution of the modification operation is performed without performing the modification operation in that record. Expected results of the execution of the modification operation are reported.

20 Claims, 5 Drawing Sheets (51) Int. Cl.
*G06F 9/455* (2018.01)
*G06F 11/30* (2006.01)
*G06F 11/36* (2006.01)

(56) References Cited

U.S. PATENT DOCUMENTS

| | | | |
|---|---|---|---|
| 7,024,430 B1 * | 4/2006 | Ingraham | G06F 16/27 |
| 8,429,303 B2 | 4/2013 | Nardone et al. | |
| 8,510,404 B2 | 8/2013 | Carmel et al. | |
| 8,682,637 B2 * | 3/2014 | Jain | G06F 9/455 703/22 |
| 9,075,788 B1 * | 7/2015 | Roth | G06F 11/3006 |
| 2008/0282124 A1 | 11/2008 | Esposito et al. | |
| 2011/0296383 A1 * | 12/2011 | Pasternak | G06F 11/3688 717/124 |
| 2012/0173490 A1 | 7/2012 | Gould et al. | |
| 2012/0253728 A1 | 10/2012 | Chamas et al. | |
| 2012/0324289 A1 | 12/2012 | Funnell | |
| 2012/0330593 A1 | 12/2012 | Johnson et al. | |
| 2013/0152047 A1 | 6/2013 | Moorthi et al. | |
| 2013/0346647 A1 | 12/2013 | Carrick et al. | |
| 2014/0258226 A1 | 9/2014 | Noteboom | |

OTHER PUBLICATIONS

International Search Report & Written Opinion received in PCT Application No. PCT/US2014/072020, dated Jul. 31, 2015, 12 pages.

Mockun, Z., "Automated tests in Continuous Integration environment—Part 2," (Web Page), Aug. 15, 2011.

Zhu; et al., "Verification and Analysis to the Simulation Platform for Optimum Frame Synchronization in Deep Space Data Receiving Missions", 44th Lunar and Planetary Science Conference, Jan. 7, 2013, 2 pages. available at <http://www.lpi.usra.edu/meetings/lpsc2013/pdf/1803.pdf>.

International Search Report & Written Opinion received in PCT Application No. PCT/US2014/072029, dated Jul. 7, 2015, 9 pages.

Xu, et al., "Time Synchronization Simulator and Its Application", 1st IEEE Conference on Industrial Electronics and Applications, Mar. 17, 2006, 6 pages. available at <http://sourcedb.ict.cas.cn/cn/ictthesis/200907/P020090722598247813771.pdf>.

* cited by examiner

SIMULATION OF A SYNCHRONIZATION OF RECORDS

BACKGROUND

Software applications are often updated to change or add new functionality. As applications develop overtime, it can be important to synchronize data between multiple projects and systems. Synchronization of data requires a delicate configuration that takes into account variations of the data. These variations may be difficult to anticipate. A reliable synchronization process can manage the applications.

DETAILED DESCRIPTION

As applications are developed, the lifecycles of the applications may be developed and managed by different teams using multiple tools, resulting in heterogeneous software stacks. The development lifecycle of applications continues to accelerate with features being added or updated at ever increasing rates, and the number of records synchronized prior to running the project increases. A process of synchronizing the data is often relied on to manage the projects that include records shared by multiple applications. For example, a project may pull records from two applications.

When managing projects between multiple applications, the synchronization between records becomes complex and oftentimes unreliable. As a result, management of projects across multiple applications may produce numerous errors during the synchronization process. Synchronizing the records in a manner that enables a user to predict issues as a result of synchronization can provide more reliable results.

As used herein, the term "application" refers to a set of programs designed to carry out operations for a specific purpose.

As used herein, the term "record" refers to a data structure shared between a plurality of applications. The data structure may be stored in a data repository, such as a database or data store.

As used herein, the phrase "modification operation" refers to an instruction or command to modify or change a record or portion of the record. For example, the operation may include a create, an update, and/or a delete instruction or command.

As used herein, the phrase "validation logic" refers to applying a modification operation on a record in an arrangement consistent with the performance of the modification operation on the record to determine a result of the modification operation without performing the modification operation on the record. In other words, results of the performance of the modification operation are provided as a result to confirm the result if or when data of the record is modified.

In an example, a simulation of a synchronization of records between applications is provided. Simulation of synchronization includes identifying a plurality of records modified since a previous synchronization of a first application and a second application. Each record of the plurality of records may be analyzed and a modification operation associated with that record. Modification operations correspond to a type of modification that can synchronize that record. A simulation of results of an execution of modification operations is performed without performing modification operations in that record. Then, expected results of execution of modification operations are reported.

Figure 1:
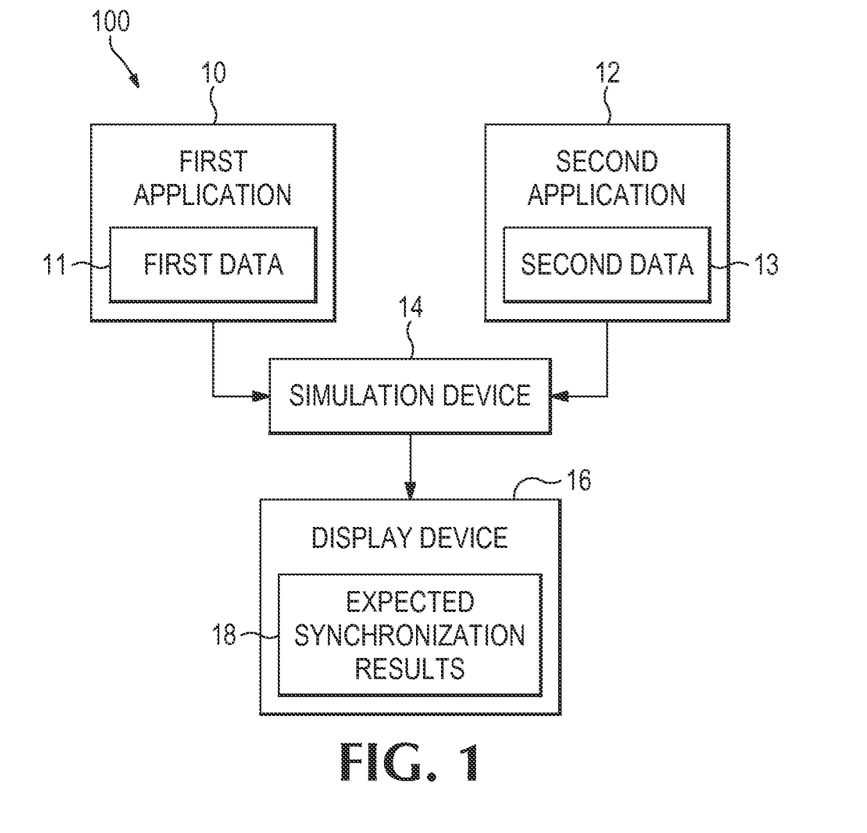
FIG. 1 depicts an overview of a system to simulate a synchronization of records according to an example.
Figure 2:
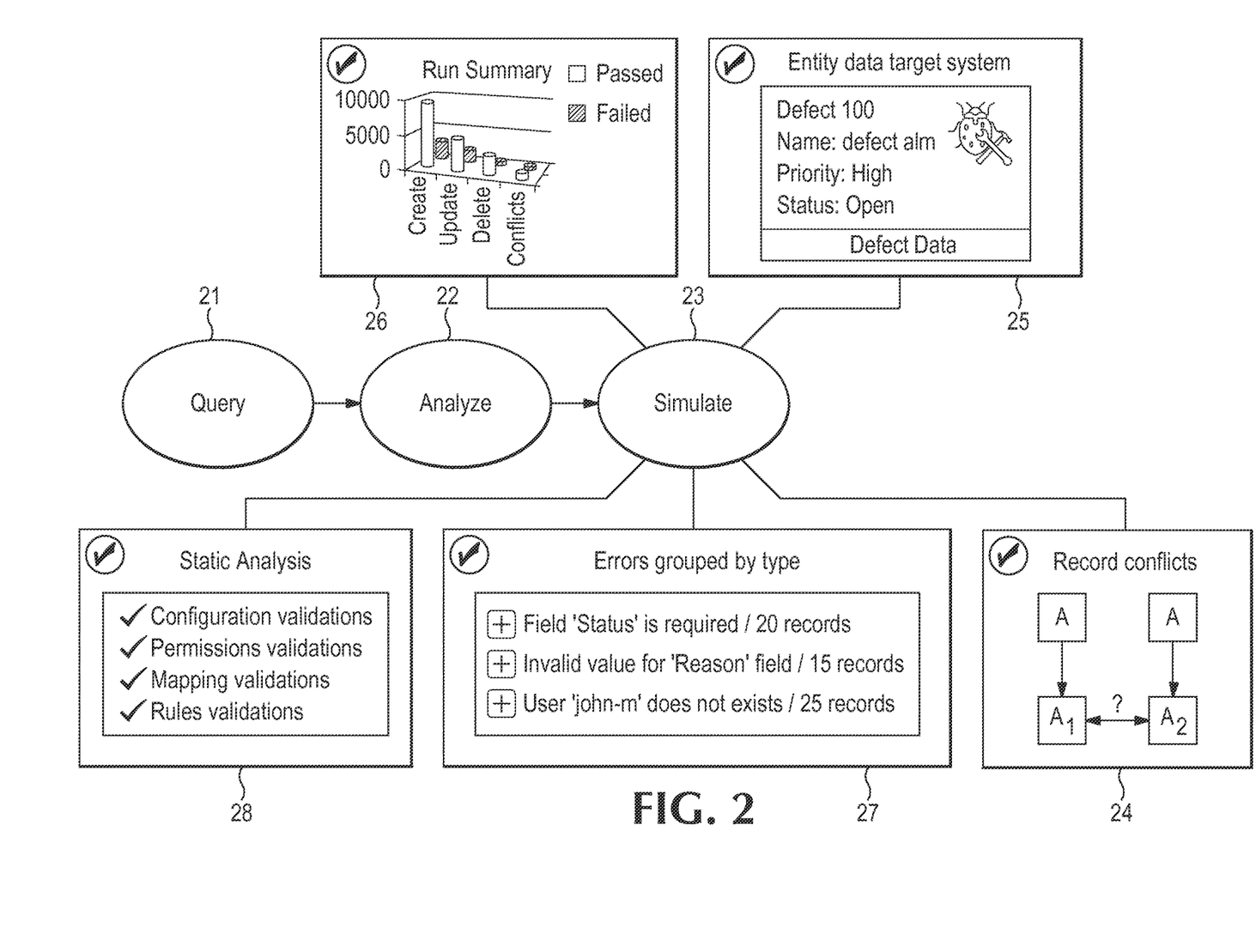
FIG. 2 depicts an example of a process to be performed by a simulation device to simulate a synchronization of records.

FIGS. 1 and 2 provide illustrative examples. FIG. 1 depicts an overview of a system 100 to simulate a synchronization of records according to an example. Referring to FIG. 1, applications, such as a first application 10 and a second application 12; a simulation device 14, and a display device 16 with expected synchronization results 16 are illustrated. First and second applications 10, 12 may include instructions that, when executed by a processing resource, perform various operations. In some examples, first and second applications 10, 12 may be stored in at least one non-transitory machine-readable storage medium, such as a non-transitory computer-readable storage medium accessible by or otherwise associated with a computing device(s) that executes instructions, receives and process information, and provides responses. For example, a computing device may be a special purpose computer, a server, a mainframe computer, a computing device, desktop computer, a laptop computer, a tablet computing device, a mobile phone, and/or any other suitable type of computing device. First application 10 provides a first set of data 11 including records, metadata, etc. associated with first application 10. Second application 12 provides a second set of data 13, including records, metadata, etc. associated with second application 12. First set of data 11 and second set of data 13 may be accessed, either directly or via a network (not shown in FIG. 1) by a simulation device 14.

Figure 3:
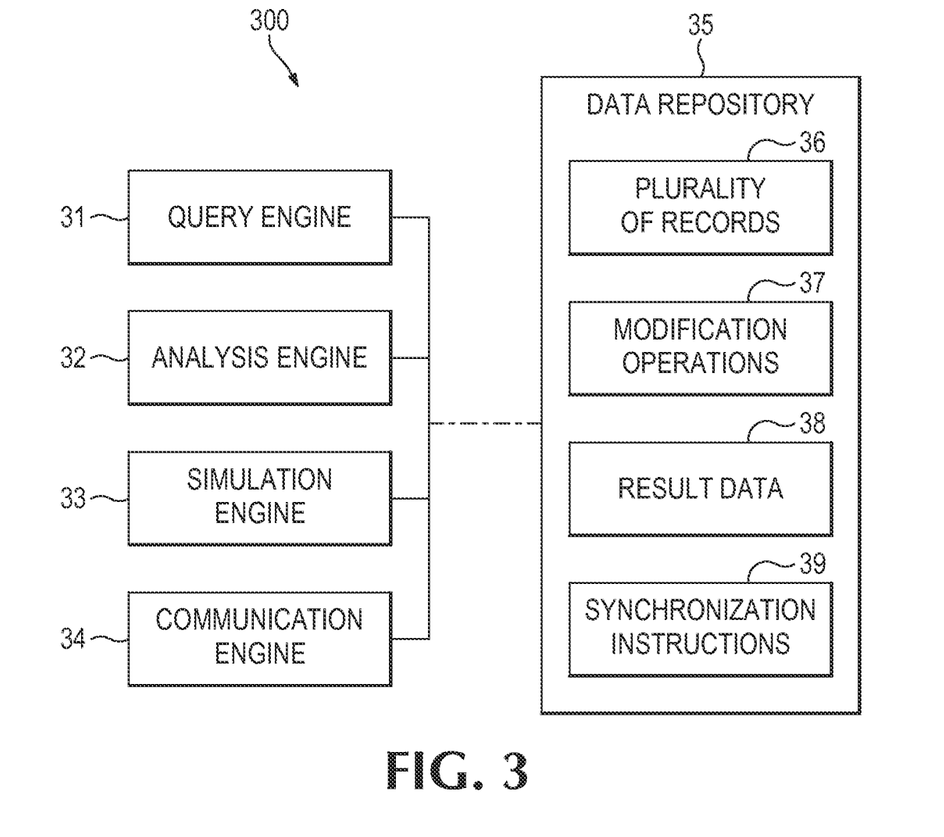
FIG. 3 is a block diagram depicting an example of a system to simulate a synchronization of records.
Figure 4:
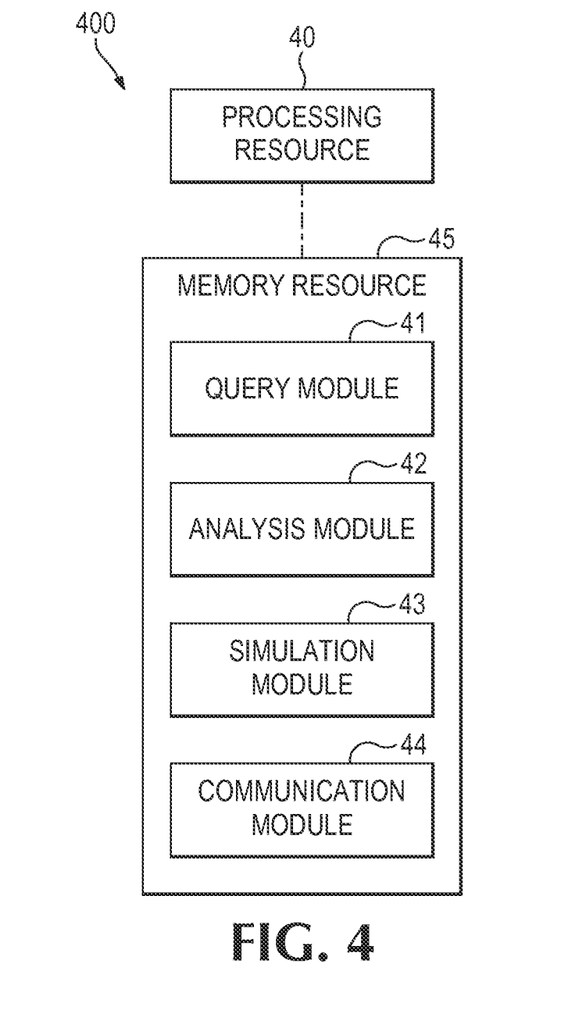
FIG. 4 is a block diagram depicting a memory resource and a processing resource according to an example.

Simulation device 14 of FIG. 1 may be part of a simulation system (illustrated in FIG. 3) that may include a processing resource and a memory resource, such as a machine-readable storage medium (illustrated in FIG. 4). A processing resource may be at least one processing unit (CPU), microprocessor, and/or another hardware device to execute instructions to perform operations. For example, a processing resource may invoke the same logic of a synchronization and communicate with applications using adapters.

Simulation device 14 simulates a synchronization of the records using first and second sets of data 11, 13. Simulation device 14 may be a computing system that performs various functions consistent with disclosed examples, such as identifying records modified, analyzing the modified records and associating a modification operation with the record, simulating results of the execution of the modification operation, and reporting expected simulation results. For example, simulation device 14 may be a special purpose computer, a server, a mainframe computer, a computing device executing instructions that receive and process information and provides responses from a mobile phone, and/or any other suitable type of computing device.

The simulation device 14 may receive input relating to changes and/or modifications to the records in the first and second applications 10, 12, such as, the first set of data 11 from the first application 10 and the second set of data 13 from the second application 12. The input may include information relating to the values and fields in the records.

For example, a common abstraction of data that may be associated with the applications may be built that covers a variety of data related to application life management solutions. Common abstractions of data may be applied on top of an extensible synchronization platform, which may be, for example, built on pluggable adapters. Each application life management solution may have a pluggable adapter associated therewith to implement a service provider interface provided by an extensible synchronization platform.

Simulation of the synchronization using common abstractions may initially analyze first and second sets of data 11, 13 to validate data flow in accordance with applications, such as checking create, read, update, and delete permissions, i.e., read-only fields cannot receive a new value. Simulation device 14 may also validate field and value mappings by: verifying that all required fields are mapped, validating data type and compatibility between various data types, and verifying size or length of data to avoid data truncation. Moreover, consistency of mappings between dependent fields may also be reviewed to avoid unexpected errors or results after synchronization. Examples of processes are described in further detail below with respect to, for example, FIG. 2.

Modifications to values and fields may be used to determine types of modification operations to associate with each record. Simulation device 14 may then simulate synchronization of records using modification operations without performing any actual modifications to values and/or fields in records, as illustrated in more detail below. After simulation of the execution of modification instructions, simulation device 14 may cause a user interface to be displayed on a display device 16. Various types of display devices 16 that present information to a user may be used, such as a user operating first and second applications 10, 12, and/or the simulation device 14 via a user interface.

FIG. 2 depicts an example of a process to be performed by a simulation device 14 of FIG. 1 to simulate a synchronization of records. In examples, simulated synchronization steps may involve a query 21, an analysis 22, and a simulation 23 processes. Simulation device 14, may query 21 first and second sets of data 11, 13 to identify a plurality of records modified since a previous synchronization of first and second applications 10, 12.

During analysis, records from both applications, i.e., first application 10 and second application 12 of FIG. 1, that were identified in the query 21 are reviewed and compared. Based on analysis, a modification operation may be associated therewith. Records with an internal mapping to data of a previous synchronization may be checked for updates and to determine appropriate updates to internal mapping for a synchronization between records of applications, i.e., first and second applications 10, 12. Updates may then be associated with a modification operation. Similarly, if internal mappings do not exist, for example, a modification only occurred in one record and the other record doesn't have any data for that field, i.e., no internal mapping, then analysis 22 may include determining a type of new record to create and associating an appropriate modification operation associated therewith.

Simulation 23 process may include a simulation of results of an execution of the modification operation without performing modification operations in that record. For example, simulation may include validating a result of a modification operation. After simulation occurs, simulation 23 portion of the process may provide an expected synchronization result for the execution of the modification operation using instructions stored in machine-readable storage medium to perform operations. For example, expected synchronization results may include a warning, an indication of discrepancies in the data, such as an empty required field, a locked field or value, an invalid user name, and an invalid list value. Expected simulation results may be determined based on validation of modification operations by a simulation 23, without performing modification operations on records. For example, values, value types, required fields, and size of data in data tables may be compared using a machine-readable medium that includes instructions that when executed by a processor performs the comparison and returns a result of the comparison including, for example, a summary of the action executed and/or errors.

Examples of expected synchronization results are illustrated in FIG. 2. Results 24 include details regarding record conflicts, such as field A in the first application having one value, $A_1$ and field A in the second application having another value, $A_2$ where $A_1$ and $A_2$ are distinct. Results 25 includes details regarding the data, such as defect data. For example, the information included in results 25 may include the defect type, name, priority, and/or status to provide information sufficient to identify and correct the defect. Results 26 illustrate an example of a run summary for a number of modification operations, such as create, update, delete, and conflicts. The run summary illustrates each modification operation with the number of each item and whether the operation passed or failed during the simulation. Results 27 illustrate an error and/or an error type, such as errors grouped by type and the number of each error. Examples of errors that may be provided include a missing field 'Status' for 20 records, an invalid value for the 'Reason' field for 15 records, and a user 'john-m' that does not exist for 25 records. Results 28 provides a further example of integrity analysis results. For example, the results of the analysis indicate that the configuration validations, permissions validations, mapping validations, and rule validations were completed with a check mark next to each type of validation.

FIG. 3 is a block diagram depicting an example of a system 300 to simulate a synchronization of records. In FIG. 3 various components are identified as engines 31-34. In describing engines 31-34, the focus is on each engine's designated function. However, the term engine, as used herein, refers to a combination of hardware and programming configured to perform a designated function. As is illustrated later with respect to FIG. 4, the hardware of each engine, for example, may include one or both of a processing resource and a memory resource, while the programming is code stored on that memory resource and executable by the processing resource to perform the designated function. A "processing resource" is an instruction execution system such as a computer/processor based system or an ASIC (Application Specific Integrated Circuit) or other system that can fetch or obtain instructions and data from machine-readable media and execute the instructions contained therein. Processing resource may include a processor to execute instructions stored in a machine-readable storage medium, such as a memory resource. Memory resource represents generally any number of memory components capable of storing instructions that can be executed by a processing resource.

As depicted in FIG. 3, system 300 includes a query engine 31, an analysis engine 32, a simulation engine 33, and a communication engine 34. The system 300 may perform functions as illustrated, for example, in flow diagram 500 of FIG. 5. In performing their respective functions, engines 31-34 may access a data repository 35. Data repository 35 may represent generally any data storage resource accessible to the system 300 that can be used to store and retrieve data. For example, data repository 35 may store a plurality of records, such as a data structure shared between first and second applications.

Query engine 31 may function to identify a plurality of records modified since a previous synchronization of applications, such as first and second applications. Query engine 31 may extract data identifying a plurality of records modified. For example, a filter and a time stamp may be used to detect changes in the plurality of records. Changes may be detected by comparing fields associated with records for time stamp and/or filter data. A time stamp may include, for example, a time and/or a version of the record. A filter may be used to identify types of changes or modifications. Results of querying records may then be saved and stored or populated in a data repository 35, such as a machine-readable storage medium, as plurality of records 36.

Analysis engine 32 may function to assign a modification operation to each record of the plurality of records modified since a previous synchronization of applications, such as first and second applications. Analysis engine 32 analyzes each record of the plurality of records 36 to determine the modification operation 37 that corresponds to that record. Modification operation 37 may be determined using a set of synchronization instructions 39, such as rules, to identify at least one action associated with that record. Modification operations 37 and synchronization instructions 39 may be stored in a machine-readable storage medium, such as data repository 35, and accessed by analysis engine 32 in performance of functions associated therewith. For example, actions may include a create, an update, and/or a delete operation. Modification operation 37 may also use a set of synchronization instructions 39 or rules to resolve conflicts between data in the plurality of records 36.

The simulation engine 33 may function to simulate execution of modification operation 37. Simulation engine 33 simulates execution of the modification operation 37 by validating an application of modification operations 37 on the plurality of records 36. Simulation engine 33 may then perform a validation logic on that record in accordance with modification operation 37 that is associated therewith, without performing modification operation 37 on that record or any of the plurality of records 36. For example, validation logic may include a comparison of logics of modification operations 37 to confirm that data or fields from each record being synchronized are compatible, i.e., the same type. Simulation engine 33 may use a set of synchronization instructions 39 to resolve conflicts between a plurality of records 36. For example, conflicts may be resolved by comparing fields of records to a preconfigured dominant field to determine appropriate merger actions for a synchronized version.

Communication engine 34 may function to provide a result of a simulation, i.e., result data 38. Result data 38 simulates results of execution of the modification operation 37, which may be generated without performing modification operation 37 on that record. Results of the simulation may include at least one simulation result or result data 38 selected from a warning, an error, an error type, a number of modification operations, and an indication of discrepancies in the data. Result data 38 may be stored in a machine-readable storage medium, such as data repository 35.

In performing their functions, query engine 31 and analysis engine 32 may gather a plurality of records 36 and perform an analysis on the plurality of records 36. During analysis, records from both applications, i.e., first application 10 and second application 12 of FIG. 1, that were identified in query engine 31 are reviewed and compared. Based on analysis, a modification operation may be associated with records. Records with an internal mapping to data of a previous synchronization may be checked for updates and to determine appropriate updates to internal mapping for a synchronization. Updates may then be associated with a modification operation 37. Similarly, if the internal mappings do not exist, then the analysis engine 32 may include determining the type of new record to create and associating the appropriate modification operation 37 with records.

Simulation engine 33 may then simulates, an execution of the modification operations 37 by applying a logic to modification operations 37 to validate a result of the operation. Results may be provided to communication engine 34 as result data 38. Communication engine 34 may display result data 38 and/or provide result data 38 to a user.

Data repository 35 may facilitate, the locating, accessing, and retrieving of data (e.g., SaaS, SQL, Access, etc. databases). Data repository 35 may be populated by a number of methods. For example, query engine 31 may populate data repository 35 with the data entries generated by query engine 31, such as plurality of records 36, and store the entries in data repository 35. Similarly, analysis engine 32, simulation engine 33, and communication engine 34 may populate data repository 35 with data entries generated by analysis engine 32, simulation engine 33, and/or communication engine 34, such as modification operations 37, result data 38, and synchronization instructions 39, and store data entries in data repository 35.

As another example, analysis engine 32 may populate data repository 35 by receiving a set of entries from another component, such as query engine 31, simulation engine 33, and/or communication engine 34 and store the entries in data repository 35. Data repository 35 entries may contain a plurality of fields, which may include information related to the plurality of records such as, date and time of a modification to records, type of modification, relationships between a type of modification and field permissions, and/or any other type of information related to the plurality of records, result data 38, and synchronization instructions 39. While in the FIG. 3 example data repository 35 is a single component, data repository 35 may include separate databases and/or may be part of engines 31-34 and/or another device internal or external to the system 300. In some implementations, data repository 35 may be managed by components that are capable of accessing, creating, controlling and/or otherwise managing data remotely through a link or a network.

In the foregoing discussion, engines 31-34 were described as combinations of hardware and programming. Engines 31-34 may be implemented in a number of fashions. Looking at FIG. 4, programming may include processor executable instructions stored on memory resource 45 and hardware may include a processing resource 40 for executing those instructions. Thus, memory resource 45 can be said to store program instructions that when executed by processing resource 40 implements system 300 of FIG. 3.

For example, the memory resource 45 may be a machine-readable storage medium may be any electronic, magnetic, optical, or other physical storage device that stores executable instructions. Thus, machine-readable storage medium may be, for example, hard drives, solid state drives, Random Access Memory (RAM), Electrically-Erasable Programmable Read-Only Memory (EEPROM), a storage drive, flash drives, portable compact discs, an optical disc, and the like. In some implementations, machine-readable storage medium may be a non-transitory computer-readable storage medium, where the term "non-transitory" does not encompass transitory propagating signals. Machine-readable storage medium may be encoded with instructions that, when executed by a processing resource, perform operations consistent with disclosed implementations. For example, machine-readable storage medium may include instructions that perform operations that may simulate synchronization of records.

FIG. 4 is a block diagram depicting a memory resource 45 and a processing resource 40 according to an example. A "processing resource" is an instruction execution system such as a computer/processor based system or an ASIC (Application Specific Integrated Circuit) or other system that can fetch or obtain instructions and data from machine-readable media and execute the instructions contained therein. Processing resource 40 may include a processor to execute instructions stored in a machine-readable storage medium, such as a memory resource 45.

Processing resource 40 of simulation device 14 may be at least one processing unit (CPU), microprocessor, and/or another hardware device to execute instructions to perform operations. For example, processing resource 40 may fetch, decode, and execute instructions stored in machine-readable storage medium (such as modification operations 37 and synchronization instruction 39) to simulate execution of synchronization instructions 39 that query 21 a plurality of records, analyze 22 the records and associate a modification instruction therewith, and simulate 23 execution of the synchronization without performing modification instructions on records as illustrated, for example, in FIG. 2 and the flow diagram of FIG. 5. Processing resource 40 represents any number of processing resources capable of executing instructions stored by memory resource 45. Processing resource 40 may be integrated in a single device or distributed across devices.

Memory resource 45 represents generally any number of memory components capable of storing instructions that can be executed by processing resource 40. Memory resource 45 or machine-readable storage medium may be any electronic, magnetic, optical, or other non-transitory storage device that stores instructions executed by a processing resource, such as a processor. Memory resource 45 is non-transitory in the sense that it does not encompass a transitory signal but instead is made up of one or more memory components configured to store the relevant instructions. Memory resource 45 may be implemented in a single device or distributed across devices. Memory resource 45 may be fully or partially integrated in the same device as processing resource 40, or it may be separate but accessible to that device and processing resource 40.

In one example, the program instructions may be part of an installation package that when installed can be executed by processing resource 40 to implement the system 300. In this case, memory resource 45 may be a portable medium such as a CD, DVD, or flash drive or a memory maintained by a server from which the installation package can be downloaded and installed. In another example, program instructions may be part of an application or applications already installed. Here, memory resource 45 may include integrated memory such as a hard drive, solid state drive, or the like.

Figure 5:
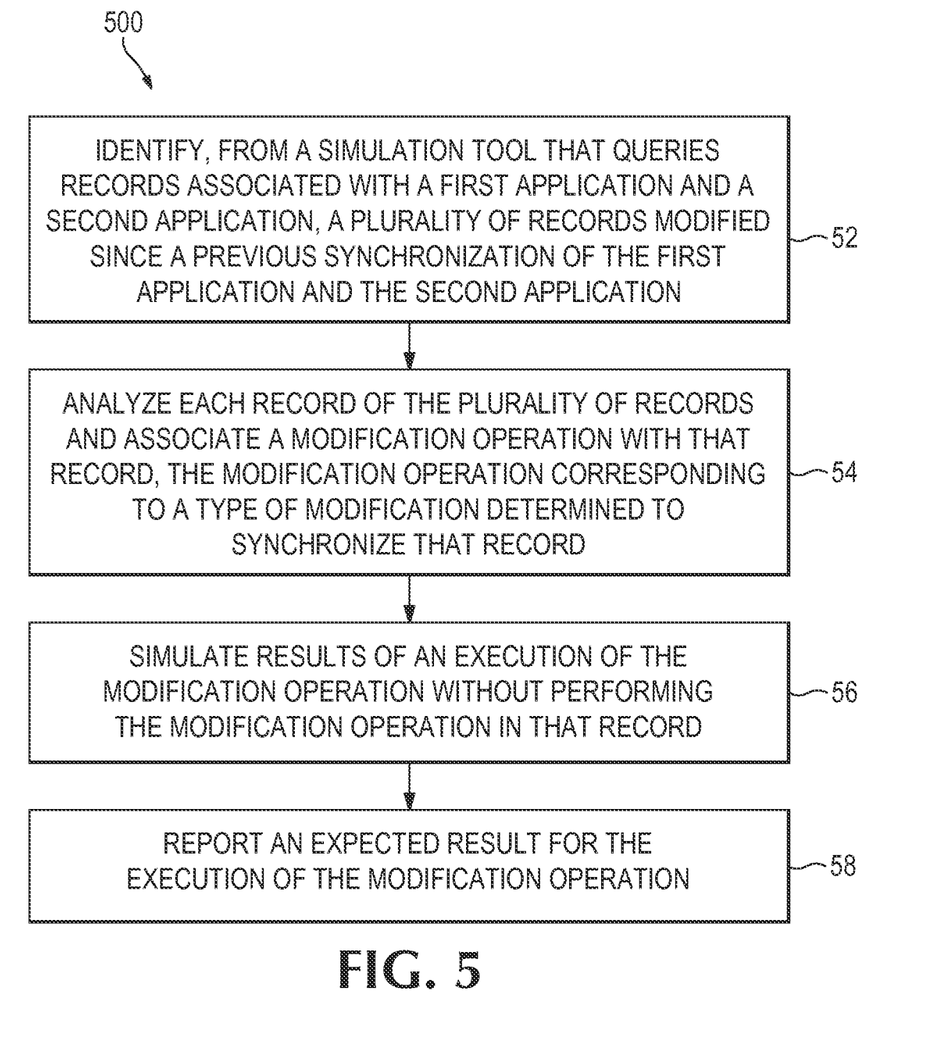
FIG. 5 is a flow diagram depicting a method to simulate a synchronization of records according to an example.

In FIG. 4, executable program instructions stored in memory resource 45 are depicted as query, analysis, simulation, and communication modules 41-44 respectively. Query module 41 and analysis module 42 represent program instructions that, when executed, cause processing resource 40 to implement query engine 31 and analysis engine 32 respectively. Likewise, simulation module 43 and the communication module 44 represent program instructions that when executed cause the implementation of simulation engine 33 and communication engine 34 respectively. FIG. 5 provides further details regarding a process to simulate synchronization of records.

FIG. 5 is a flow diagram 500 depicting a method to simulate a synchronization of records according to an example. In discussing FIG. 5, reference may be made to components depicted in FIGS. 1-4. Such reference is made to provide contextual examples and not to limit the manner in which the method depicted by FIG. 5 may be implemented. FIG. 5 refers to a simulation tool. A simulation device 14 of FIG. 2 may include a simulation tool or a portion of the simulation tool that may perform the function described herein.

In block 52, a simulation tool queries records associated with first and second applications and identifies a plurality of records modified since a previous synchronization of applications. An implementation of block 52 may be accomplished, for example, by accessing a data repository or other data store and processing the plurality of records collected or assembled for the application using, for example, a simulation device that supports the simulation tool. Moreover, an implementation of block 52 may be accomplished by receiving from the synchronization tool, a communication identifying the plurality of records modified since previous synchronization of applications. The previous synchronization may be determined using a filter and/or a time stamp to detect changes in the plurality of records. For example, a previous synchronization time may be based on a time and/or a version. Referring back to FIG. 3, query engine 31 may be responsible for implementing block 52.

In block 54, a simulation tool, analyzes each record of the plurality of records and associates a modification operation with that record. Modification operations correspond to a type of modification determined to synchronize that record. An implementation of block 54 may be accomplished, for example, by accessing a data repository or other data store maintained for the synchronization tool and processing the association or assignment of the modification operations to the plurality of records for application. Referring back to FIG. 3, analysis engine 32 may be responsible for implementing block 54. Association of the modification operation in block 54, may include analyzing internal mappings to determine the modification operation to implement in that record. For example, a modification may be needed for a record with an internal mapping, the analysis includes checking for an update and determining the appropriate update. The appropriate update is then associated with a modification operation, such as a create operation, an update operation, and a delete operation. In contrast, if an internal mapping does not exist, then analysis engine may determine the type of new record to create and a modification operation associated therewith.

Simulating results of an execution of the modification operation may be performed by a simulation tool in block 56 without performing modification operations in that record. An implementation of block 56 may be accomplished, for example, by accessing a data repository or other data store maintained for the synchronization tool and processing a simulation of modification operations to the plurality of records for application. Simulation may include applying a validation logic of modification operations to records by comparing and confirming that data or fields from each record being synchronized are compatible, i.e., the same type. Validation logic may also resolve conflicts between a plurality of records by comparing fields of records to a preconfigured dominant field to determine appropriate merger actions for a synchronized version. Referring back to FIG. 3, the simulation engine 33 may be responsible for implementing block 56.

In block 58, a simulation tool reports an expected synchronization result for execution of the modification operation. An implementation of block 58 may be accomplished, for example, by accessing a data repository or other data store maintained for the synchronization tool and processing results data for the application. For example, result data 38 may include a warning, an indication of discrepancies in data, an error, a number of modification operations and a run summary, an error type, and integrity analysis results. Referring back to FIG. 3, communication engine 34 may be responsible for implementing block 58.

Method illustrated in flow diagram 500 may also include performing an integrity analysis of applications. The integrity analysis may include obtaining create, read, update, and delete permissions by analyzing each record for permissions. Integrity analysis may also include validating data flow directions. For example, a simulation tool reviews records to check create, read, update, and delete permissions; map data flow directions, check that all required fields are mapped in records, verify data type compatibility, and check data sizes and lengths to avoid truncation. Integrity analysis may further include validating mappings of data. For example, mappings may be validated using instructions to follow mappings of data in records and either confirm mappings do not produce an error and/or provide an error message when an error is produced. Moreover, integrity analysis may include verifying, consistency of mappings between fields. For example, mappings between fields for multiple records may be compared and may determine if there are any inconsistencies or discrepancies between data fields.

FIGS. 1-4 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that includes one or more executable instructions to implement any specified logical function(s). Each component or various combinations thereof may represent a circuit or a number of interconnected circuits to implement the specified logical function(s).

Although the flow diagram of FIG. 5 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

Various implementations have been shown and described with reference to the foregoing examples. It is to be understood, however, that the present disclosure merely sets forth possible examples of implementations, and many variations and modifications may be made to the described examples. All such modifications and variations are intended to be included within the scope of this disclosure and protected by the following claims.

What is claimed is:

1. A method to simulate a synchronization of records between applications comprising:
    identifying, from a simulation tool that queries data records of a first application and a second application, a plurality of records that were modified since a previous synchronization of the first application and the second application;
    analyzing the plurality of records to identify modification operations associated with the plurality of records, the modification operations corresponding to types of modifications implemented on the plurality of records;
    identifying, among the plurality of records, a set of records that have internal mappings to the data records of the first application and the second application of the previous synchronization;
    determining updates of the internal mappings;
    associating the updates of the internal mappings with the modification operations associated with the set of records that have the internal mappings;
    simulating an execution of the modification operations on the data records of the first application and the second application to simulate a synchronization between the first application and the second application without performing actual modifications on the data records of the first application and the second application;
    performing an integrity analysis on the plurality of records, including verifying a consistency between a result of the simulated execution of the modification operations and the plurality of records; and
    reporting a result of the integrity analysis and the result of the simulated execution of the modification operations.

2. The method of claim 1, wherein performing the integrity analysis further includes:
    obtaining permissions of a create operation, a read operation, an update operation, and a delete operation for the plurality of records,
    validating mappings of data in the plurality of records, and
    verifying consistency of mappings between fields of the plurality of records.

3. The method of claim 1, wherein analyzing the plurality of records to identify the modification operations associated with the plurality of records comprises analyzing internal mappings of the plurality of records to determine the modification operations implemented on the plurality of records.

4. The method of claim 1, wherein the modification operations comprise at least one of the following operations: a create operation, an update operation, and a delete operation.

5. The method of claim 1, wherein identifying the plurality of records that were modified since the previous synchronization includes using a filter and a time stamp to detect changes in the plurality of records.

6. A memory resource storing instructions that when executed cause a processing resource to implement a system to simulate a synchronization of records, the instructions comprising instructions that cause the processing resource to:
    analyze data of a first application and a second application to identify a plurality of records that were modified since a previous synchronization of the first application and the second application;
    determine modification operations associated with the plurality of records using a set of synchronization instructions;

identify, among the plurality of records, a set of records that have internal mappings to the data of the first application and the second application of the previous synchronization;

determine updates of the internal mappings;

associate the updates of the internal mappings with the modification operations associated with the set of records that have the internal mappings;

simulate an execution of the modification operations on the data of the first application and the second application to simulate a synchronization between the first application and the second application without performing actual modifications on the data of the first application and the second application;

perform an integrity analysis on the record, including causing the processing resource to verify a consistency between a result of the simulated execution of the modification operations and the plurality of records; and provide a result of the integrity analysis and the result of the simulated execution of the modification operations.

7. The memory resource of claim 6, wherein the modification operations associated with the plurality of records include at least one of a create operation, an update operation, and a delete operation.

8. The memory resource of claim 6, wherein the instructions are executable to cause the processing resource to use the set of synchronization instructions to resolve conflicts between data in the plurality of records of the first and second applications.

9. The memory resource of claim 6, wherein the instructions that cause the processing resource to simulate the execution of the modification operations include instructions that cause the processing resource to perform a validation logic on the plurality of records.

10. The memory resource of claim 6, wherein the result of the simulated execution of the modification operations includes one of a warning, an error, an error type, a number of modification operations, and an indication of discrepancies in the plurality of records.

11. A system to simulate a synchronization of records between applications, the system comprising:

a processor; and a memory storing instructions executable to cause the processor to:

analyze datasets of a first application and a second application to identify a plurality of records that were modified since a previous synchronization of the first application and the second application;

determine modification operations associated with the plurality of records using a set of synchronization instructions;

identify, among the plurality of records, a set of records that have internal mappings to the datasets of the first application and the second application of the previous synchronization;

determine updates of the internal mappings;

associate the updates of the internal mappings with the modification operations associated with the set of records that have the internal mappings;

simulate an execution of the modification operations on the datasets of the first application and the second application to simulate a synchronization between the first application and the second application without performing actual modifications on the datasets of the first application and the second application;

perform an integrity analysis on the plurality of records, including causing the processor to verify a consistency between a result of the simulated execution of the modification operations and the plurality of records; and provide a result of the integrity analysis and the result of the simulated execution of the modification operations.

12. The system of claim 11, wherein the instructions that cause the processor to identify the plurality of records that were modified since the previous synchronization of the first application and the second application include instructions that cause the processor to use a filter and a timestamp to detect changes in the plurality of records of the first and second applications.

13. The system of claim 11, wherein the instructions that cause the processor to perform the integrity analysis include instructions that cause the processor to:

obtain permissions of a create operation, a read operation, an update operation, and a delete operation for the plurality of records, validate mappings of data in the plurality of records, and verify consistency of mappings between fields of the plurality of records.

14. The system of claim 11, wherein the instructions are executable to cause the processor to resolve conflicts between the plurality of records according to the set of synchronization instructions.

15. The system of claim 11, wherein the instructions that cause the processor to simulate the execution of the modification operations include instructions that cause the processor to perform a validation logic on the plurality of records.

16. The memory resource of claim 6, wherein the instructions that cause the processing resource to perform the integrity analysis include instructions that cause the processing resource to:

obtain permissions of a create operation, a read operation, an update operation, and a delete operation for the plurality of records, validate mappings of data in the plurality of records, and verify consistency of mappings between fields of the plurality of records.

17. The memory resource of claim 6, wherein the instructions are executable to cause the processing resource to:

validate data flow directions of the plurality of records.

18. The method of claim 1, further comprising:

validating data flow directions of the plurality of records.

19. The system of claim 11, wherein the instructions are executable to cause the processor to:

validate data flow directions of the plurality of records.

20. The system of claim 11, wherein the modification operations comprise at least one of a create operation, an update operation, and a delete operation.

* * * * *